(12) United States Patent
Itoh et al.

(10) Patent No.: US 11,665,593 B2
(45) Date of Patent: May 30, 2023

(54) MANAGEMENT SERVER, DATA PROCESSING METHOD, AND NON-TRANSITORY COMPUTER-READABLE MEDIUM

(71) Applicant: NEC Corporation, Tokyo (JP)

(72) Inventors: Nobuhiko Itoh, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/288,655

(22) PCT Filed: Sep. 27, 2019

(86) PCT No.: PCT/JP2019/038306
§ 371 (c)(1),
(2) Date: Apr. 26, 2021

(87) PCT Pub. No.: WO2020/095568
PCT Pub. Date: May 14, 2020

(65) Prior Publication Data
US 2021/0400536 A1      Dec. 23, 2021

(30) Foreign Application Priority Data

Nov. 7, 2018   (JP) .............................. JP2018-209525

(51) Int. Cl.
*H04W 28/10*   (2009.01)
*H04L 47/32*   (2022.01)
*H04W 28/18*   (2009.01)

(52) U.S. Cl.
CPC ............. *H04W 28/10* (2013.01); *H04L 47/32* (2013.01); *H04W 28/18* (2013.01)

(58) Field of Classification Search
CPC ...... H04W 28/10; H04W 28/18; H04L 47/32; G06F 13/00
See application file for complete search history.

(56) References Cited

U.S. PATENT DOCUMENTS

2004/0250203 A1* 12/2004 Yamada ................ G06F 40/166
                                                                715/219
2015/0189539 A1*  7/2015 Li ....................... H04L 41/5025
                                                                370/230

(Continued)

FOREIGN PATENT DOCUMENTS

JP         2002-247041 A      8/2002
JP         2003-309573 A      10/2003

(Continued)

OTHER PUBLICATIONS

ETSI TS 123 203, V15.3.0 (Jul. 2018), Technical Specification; Digital cellular telecommunications system (Phase 2+) (GSM); Universal Mobile Telecommunications System (UMTS); LTE; Policy and charging control architecture (3GPP TS 23.203 version 15.3.0 Release 15); 3GPP TS 23.203 version 15.3.0 Release 1 (Year: 2018).*

(Continued)

*Primary Examiner* — Kibrom T Hailu
*Assistant Examiner* — Nizam U Ahmed

(57) ABSTRACT

An object is to provide a management server for performing a technique to satisfy a predetermined latency requirement in an end-to-end flow. A management server (10) according to the present disclosure includes: a control unit (11) configured to distribute permissible latency associated with an end-to-end flow to an uplink flow and a downlink flow, where the end-to-end flow is to be transmitted from a communication terminal of a transmission source to a communication terminal of a transmission destination via an application server, based on a data size of the uplink flow, and a data size of the downlink data which is different from the data size of the uplink flow; and monitoring unit (12) configured to cause an uplink flow that has exceeded the permissible latency distributed to the uplink flow to be (Continued)

discarded in the communication terminal of the transmission source or the application server.

7 Claims, 6 Drawing Sheets

(56) References Cited

U.S. PATENT DOCUMENTS

| | | | |
|---|---|---|---|
| 2016/0226742 A1* | 8/2016 | Apathotharanan | H04L 45/64 |
| 2016/0323887 A1* | 11/2016 | Patel | H04W 52/146 |
| 2017/0180103 A1* | 6/2017 | Min | H04W 74/0816 |
| 2018/0106887 A1 | 4/2018 | Choi et al. | |
| 2018/0324825 A1* | 11/2018 | Jiang | H04W 72/1215 |

FOREIGN PATENT DOCUMENTS

| | | |
|---|---|---|
| JP | 2005-303900 A | 10/2005 |
| JP | 2017-017655 A | 1/2017 |
| JP | 2018-063231 A | 4/2018 |

OTHER PUBLICATIONS

International Search Report for PCT Application No. PCT/JP2019/038306, dated Nov. 5, 2019.

* cited by examiner

MANAGEMENT SERVER, DATA PROCESSING METHOD, AND NON-TRANSITORY COMPUTER-READABLE MEDIUM

This application is a National Stage Entry of PCT/JP2019/038306 filed on Sep. 27, 2019, which claims priority from Japanese Patent Application 2018-209525 filed on Nov. 7, 2018, the contents of all of which are incorporated herein by reference, in their entirety.

TECHNICAL FIELD

The present disclosure relates to a management server, a data processing method, and a program.

BACKGROUND ART

Currently, studies are going on to provide ultra-low latency services via mobile networks. The ultra-low latency service may be, for example, an automatic driving service that transmits in-vehicle sensor information, traffic camera information, map information, and the like via a mobile network.

Mobile carriers (mobile communication businesses) need to guarantee an SLA (Service Level Agreement) in order to provide ultra-low latency services to users. The SLA may specify, for example, the latency time guaranteed in the ultra-low latency service.

Patent Literature 1 describes that a latency requirement of a communication terminal is determined according to the characteristics of the communication terminal. The base station disposed in the wireless access network manages wireless resources so as to satisfy the latency requirement set for each communication terminal. For example, wireless resources are preferentially allocated to communication terminals with strict latency requirements.

CITATION LIST

Patent Literature

Patent Literature 1: Japanese Unexamined Patent Application Publication No. 2017-017655

SUMMARY OF INVENTION

Technical Problem

By the way, in order to guarantee the SLA to the user, the mobile carrier needs to satisfy latency requirements which are predetermined in end-to-end flows such as between communication terminals that communicate via a mobile network or between a communication terminal and a server. Therefore, there is a further demand for a technique for satisfying a predetermined latency requirement in an end-to-end flow.

It is an object of the present disclosure to provide a management server, a data processing method, and a program for performing a technique to satisfy a predetermined latency requirement in an end-to-end flow.

Solution to Problem

A management server according to a first aspect of the present disclosure includes: a control unit configured to distribute permissible latency associated with an end-to-end flow to an uplink flow and a downlink flow, where the end-to-end flow is to be transmitted from a communication terminal of a transmission source to a communication terminal of a transmission destination via an application server, based on a data size of the uplink flow transmitted from the communication terminal of the transmission source to the application server, and a data size of the downlink flow transmitted from the application server to the communication terminal of the transmission destination, the data size of the downlink data being different from the data size of the uplink flow; and a monitoring unit configured to cause an uplink flow that has exceeded the permissible latency distributed to the uplink flow to be discarded in the communication terminal of the transmission source or the application server.

A data processing method according to a second aspect of the present disclosure includes: distributing permissible latency associated with an end-to-end flow to an uplink flow and a downlink flow, where the end-to-end flow is to be transmitted from a communication terminal of a transmission source to a communication terminal of a transmission destination via an application server, based on a data size of the uplink flow transmitted from the communication terminal of the transmission source to an application server, and a data size of the downlink flow transmitted from the application server to the communication terminal of the transmission destination, the data size of the downlink data being different from the data size of the uplink flow; and causing an uplink flow that has exceeded the permissible latency distributed to the uplink flow to be discarded in the communication terminal of the transmission source or the application server.

A program according to a third aspect of the present disclosure makes a computer distribute permissible latency associated with an end-to-end flow to an uplink flow and a downlink flow, where the end-to-end flow is to be transmitted from a communication terminal of a transmission source to a communication terminal of a transmission destination via an application server, based on a data size of the uplink flow transmitted from the communication terminal of the transmission source to an application server, and a data size of the downlink flow transmitted from the application server to the communication terminal of the transmission destination, the data size of the downlink data being different from the data size of the uplink flow, and cause an uplink flow that has exceeded the permissible latency distributed to the uplink flow to be discarded in the communication terminal of the transmission source or the application server.

Advantageous Effects of Invention

The present disclosure can provide a management server, a data processing method, and a program for performing a technique to satisfy a predetermined latency requirement in an end-to-end flow.

DESCRIPTION OF EMBODIMENTS

First Example Embodiment

Figure 1:
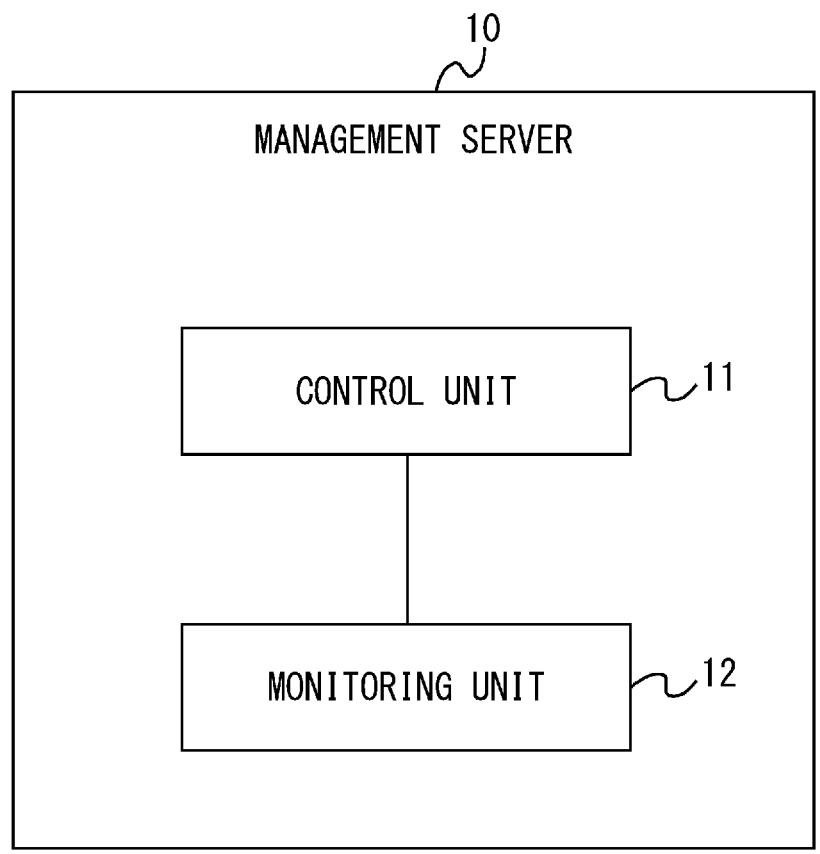
FIG. 1 is a block diagram of a management server according to a first example embodiment.

Hereinafter, example embodiments of the present disclosure will be described with reference to the drawings. A configuration example of a management server 10 according to a first example embodiment will be described with reference to FIG. 1. The management server 10 may be a computer device operated by a processor executing a program stored in a memory.

The management server 10 includes a control unit 11 and a monitoring unit 12. The control unit 11 and the monitoring unit 12 may be software or modules whose processing is performed by a processor executing a program stored in the memory. The control unit and the communication unit may be referred to as a control module or a communication module, and the like. Further, the control unit 11 and the monitoring unit 12 may be hardware such as a circuit or a chip.

The control unit 11 distributes permissible latency associated with an end-to-end flow to an uplink flow and a downlink flow based on the data size of the uplink flow and the data size of the downlink flow. The uplink flow is a flow transmitted from a communication terminal of a transmission source to an application server. The downlink flow is a flow transmitted from the application server to a communication terminal of a transmission destination. The end-to-end flow is a flow transmitted from a communication terminal of a transmission source to a communication terminal of a transmission destination via the application server. Also, the data size of the uplink flow is different from that of the downlink flow.

The communication terminal may be a computer device having a communication function, such as a mobile phone terminal or a smartphone terminal. Further, the communication terminal may be an IoT (Internet of Things) terminal, an MTC (Machine Type Communication) terminal, or the like. The uplink flow, downlink flow, and end-to-end flow (hereinafter referred to as flow) include, for example, one or more data transmitted in an application service provided to a communication terminal. Further, the data included in the flow may be referred to as a data packet. Further, the data included in the flow may be referred to as a chunk composed of one or more data packets.

The data transmitted in the application service (for example, application data) may be, for example, image data, moving image data, or the like. Further, the application data may include a request message requesting transmission of image data, etc., a response message in response to the request message, and the like.

The permissible latency may be referred to as a deadline or a transmission deadline. The permissible latency means a time limit for completing the transmission of a plurality of data packets included in one flow. The permissible latency is required by an application. The permissible latency can also be called a transmission time limit. Alternatively, the permissible latency can be called a maximum transmission latency permitted by the application. The permissible latency can be defined in various ways. For example, the permissible latency may indicate a time limit for completion of transmission by a sender of an application layer. Alternatively, the permissible latency may indicate the time limit for completion of transmission by a sender of a wireless layer. Alternatively, the permissible latency may indicate the time limit for completion of reception by a receiver of the application layer. Alternatively, the permissible latency may indicate the time limit for completion of reception by a receiver of the wireless layer. Alternatively, the permissible latency indicates the time limit for a receiver of the application layer to complete reception of the last data packet concerning one flow from when a sender of the application layer starts transmission of the first data packet concerning the one flow. Alternatively, the permissible latency may indicate the time limit for a receiver of the wireless layer to complete reception of the last data packet concerning one flow from when the sender of the wireless layer starts transmission of the first data packet concerning the one flow.

The data size of the uplink flow may be a sum of the data sizes of the respective data included in the uplink flow in a predetermined period. Alternatively, the data size of the uplink flow may be an average, median, maximum, or minimum value of the data size of each data included in the uplink flow in a predetermined period. Alternatively, the data size of the uplink flow may be predetermined according to the data type. As the data type, for example, still image data, moving image data, text data, or the like may be defined. The definition of the data size of the downlink flow is the same as the definition of the data size of the uplink flow.

For example, the data type of the uplink flow may be moving image data, and the data type of the downlink flow may be text data.

The control unit 11 distributes the permissible latency associated with the end-to-end flow such that the total of the permissible latency assigned to the uplink flow (hereinafter referred to as uplink permissible latency) and the permissible latency assigned to the downlink flow (hereinafter referred to as downlink permissible latency) matches the permissible latency associated with the end-to-end flow.

The control unit 11 may allocate a larger permissible latency to a flow having a large data size than to a flow having a small data size. For example, the control unit 11 may proportionally distribute the permissible latency associated with an end-to-end flow according to the ratio between the data size of the uplink flow and the data size of the downlink flow. Alternatively, the control unit 11 may predetermine a distribution ratio of permissible latency for the flow having a larger data size and the flow having a smaller data size in the uplink flow and the downlink flow.

The monitoring unit 12 causes an uplink flow that exceeds the permissible latency distributed to the uplink flow to be discarded in the UE. The monitoring unit 12 determines, for example, the time until an uplink flow transmitted from the communication terminal of the transmission source reaches the application server. The monitoring unit 12 compares the determined time with the permissible latency distributed to the uplink flow, and if the determined time exceeds the permissible latency distributed to the uplink flow, transmits a message that instructs to discard the uplink flow to the UE. Discarding may be paraphrased as disposing or deleting.

Note that the UE may transmit some data in the uplink flow that does not exceed the permissible latency to the application server and discard the remaining data. In this case, the application server may discard data in the uplink flow that is transmitted to the application server without being discarded. The monitoring unit 12 may transmit a message to the application server that instructs to discard data in the uplink flow that is transmitted to the application server without being discarded in the UE.

Further, the monitoring unit 12 may transmit the permissible latency distributed to the uplink flow to the application server in advance, and have the latency of the uplink flow and the permissible latency compared with each other in the application server or the UE. The application server or the UE may discard the uplink flow if the latency of the uplink flow exceeds the permissible latency.

As described above, the management server 10 can distribute the permissible latency associated with the end-to-end flow to the uplink flow and the downlink flow according to the respective data sizes of the uplink flow and the downlink flow. From this, for example, the management server 10 can allocate a larger permissible latency to a flow having a larger data size, and a smaller permissible latency to a flow having a smaller data size in the uplink flow and the downlink flow. As a result, it is possible to reduce the possibility that the latencies of the uplink flow and the downlink flow exceed the permissible latencies allocated to each of them. It is also possible to reduce the possibility that the uplink flow will be discarded in the UE or the application server.

Second Example Embodiment

Figure 2:
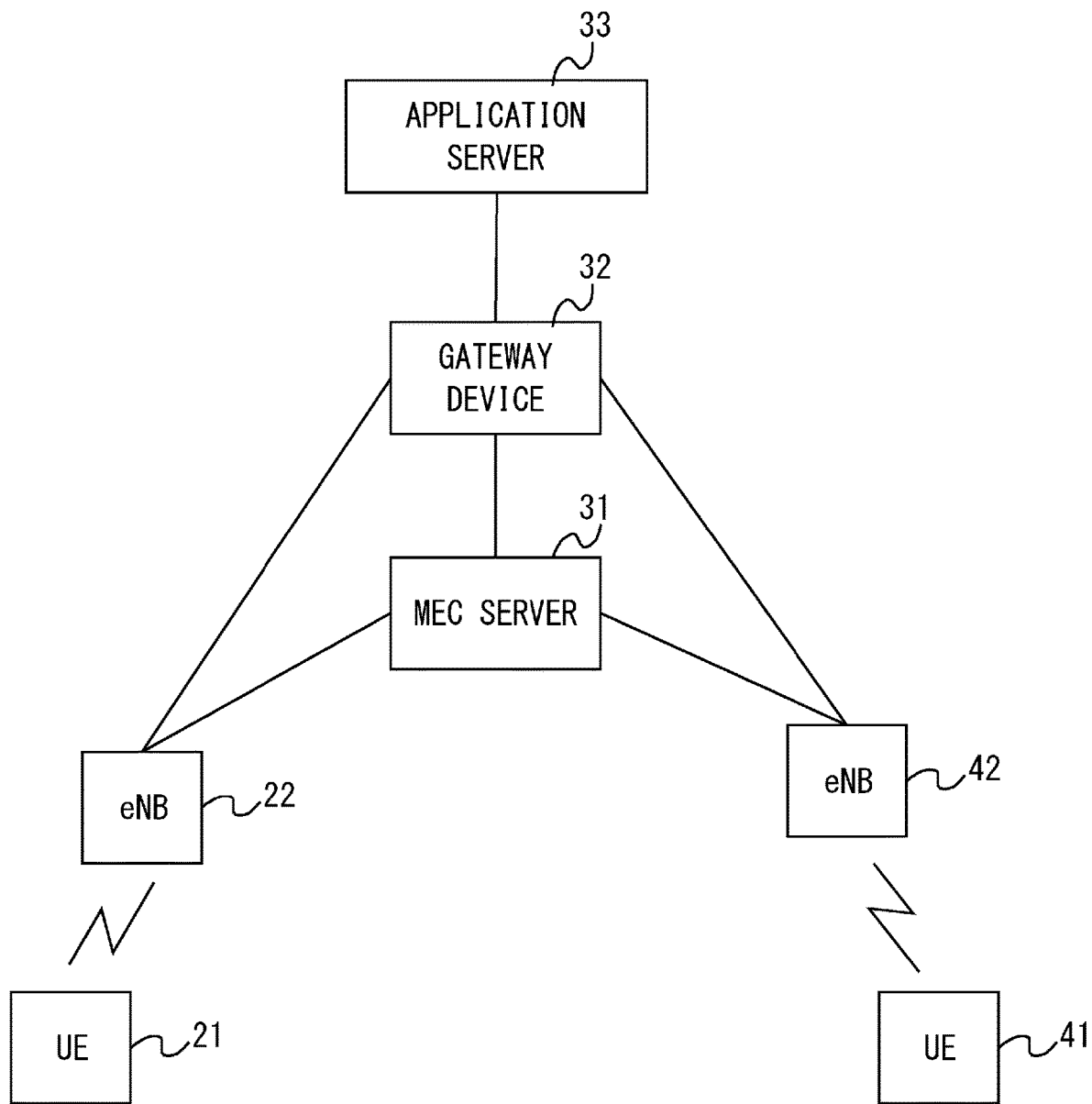
FIG. 2 is a block diagram of a communication system according to a second example embodiment.

Subsequently, a configuration example of the communication system according to a second example embodiment will be described with reference to FIG. 2. The communication system of FIG. 2 includes a UE (User Equipment) 21, an eNB (evolved Node B) 22, a UE 41, an eNB 42, a MEC (Mobile Edge Computing) server 31, a gateway device 32, and an application server 33. The UE is a term used as a general term for communication terminals in 3GPP (3rd Generation Partnership Project). The eNB is a base station that supports LTE (Long Term Evolution) specified as a wireless communication system in 3GPP. In FIG. 2, the UE 21 will be described as a communication terminal of a transmission source, and the UE 41 as a communication terminal of a transmission destination.

The eNB 22 performs resource scheduling related to the UE 21. Resource scheduling may be referred to as, for example, resource management. The eNB 42 performs resource scheduling related to the UE 41. The flow transmitted from the UE 21 is transmitted to the UE 41 via the application server 33. At this time, the flow transmitted from the UE 21 may be transmitted to the application server 33 via the eNB 22 and the gateway device 32. Alternatively, the flow transmitted from the UE 21 may be transmitted to the application server 33 via the eNB 22, the MEC server 31, and the gateway device 32.

Further, the flow transmitted from the application server 33 may be transmitted to the UE 41 via the gateway device 32 and the eNB 42. Alternatively, the flow transmitted from the application server 33 may be transmitted to the UE 41 via the gateway device 32, the MEC server 31, and the eNB 42.

The MEC server 31 corresponds to the management server 10 in FIG. 1. The MEC server 31 is a server that is disposed at a position near the UE, and is disposed in the vicinity of the eNB 22 or the eNB 42 in FIG. 2. The MEC server 31 may be used as the application server. In this case, the flow between the UE 21 and the UE 41 is transmitted to the UE 41 via the eNB 22, the MEC server 31, and the eNB 42. The latency between the UE 21 and the UE 41 can be reduced by the MEC server 31, which is disposed in the vicinity of the UE, providing an application service.

Further, although it is shown in FIG. 2 that only one MEC server 31 is disposed, for example, one MEC server may be disposed in the vicinity of the eNB 22 and another MEC server may be disposed in the vicinity of the eNB 42. In this case, the flow between the UE 21 and the UE 41 may go through two MEC servers, or may go through only one of the MEC servers that provides application services related to the flow.

The gateway device 32 relays the flow transmitted among the eNB 22, the application server 33, and the eNB 42. Alternatively, the gateway device 32 relays the flow transmitted between the MEC server 31 and the application server 33. The gateway device 32 may be, for example, an SGW (Serving Gateway) and a PGW (Packet Data Network Gateway) specified in 3GPP. Although it is shown in FIG. 2 that only one gateway device 32 is disposed, for example, two or more gateway devices 32 may be disposed. The application server 33 is a server that provides application services to the UE 21 and the UE 41.

The communication path between the UE 21 and the application server 33 is referred to as an uplink path segment. The communication path between the application server 33 and the UE 41 is referred to as a downlink path segment. When the MEC server 31 is used as the application server, the communication path between the UE 21 and the MEC server 31 is referred to as an uplink path segment. Further, when the MEC server 31 is used as an application server, the communication path between the MEC server 31 and the UE 41 is referred to as a downlink path segment.

Figure 3:
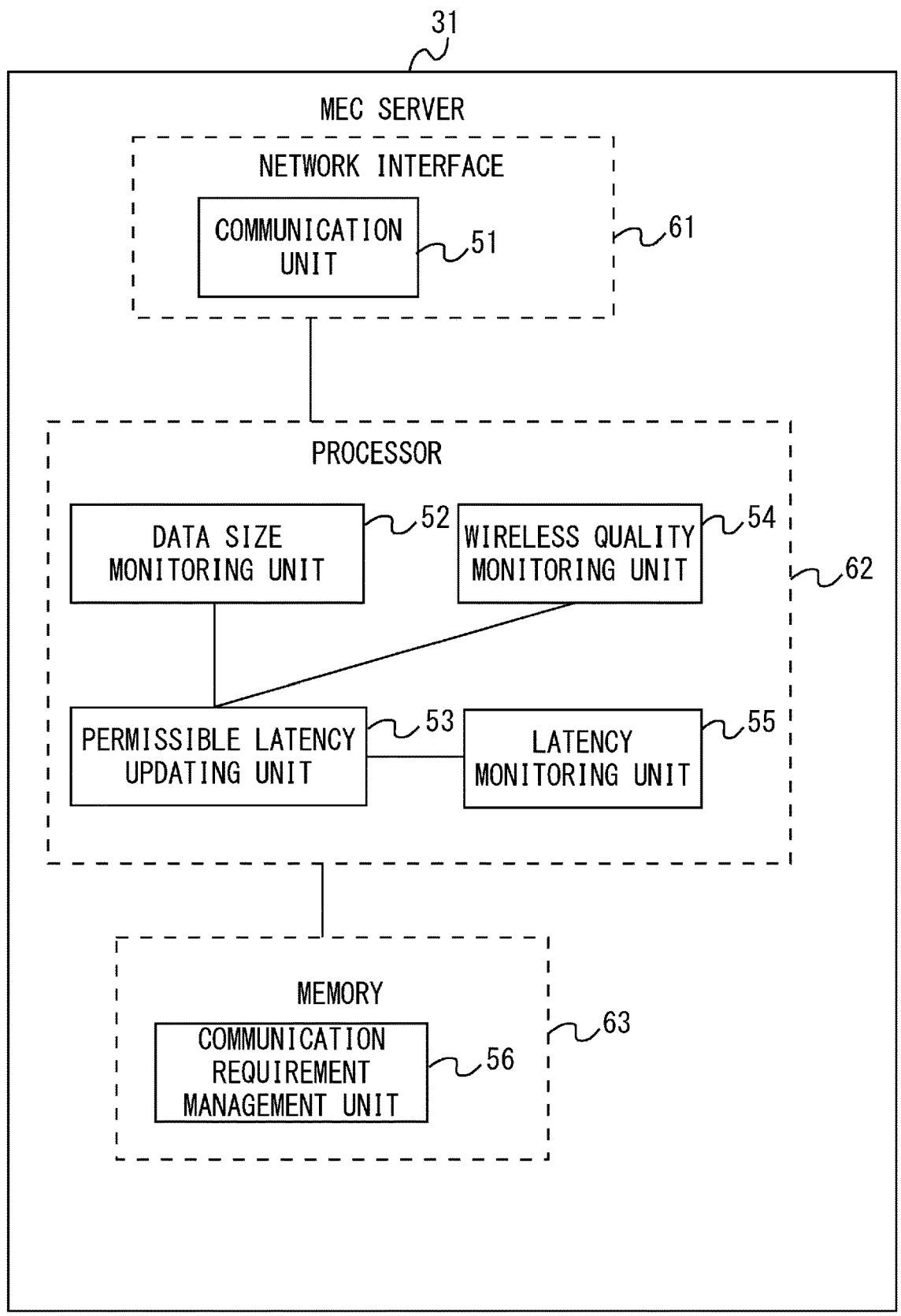
FIG. 3 is a block diagram of an MEC server according to the second example embodiment.

Subsequently, a configuration example of the MEC server 31 according to the second example embodiment will be described with reference to FIG. 3. The MEC server 31 includes a network interface 61, a processor 62, and a memory 63.

The network interface 61 is used to communicate with other communication network devices. The network interface 61 may include a network interface card (NIC) compliant with the IEEE 802.3 series. The network interface 61 includes a communication unit 51.

The communication unit 51 transmits and receives data among the eNB 22, the eNB 42, and the gateway device 32.

The processor 62 reads out software (a computer program) from the memory 63, and performs the processing described below using a flowchart or the like. The processor 62 may be, for example, a microprocessor, an MPU (Micro Processing Unit), or a CPU (Central Processing Unit). The processor 62 may include a plurality of processors.

The memory 63 is constituted by a combination of a volatile memory and a non-volatile memory. The memory 63 may include storage disposed away from the processor 62. In this case, the processor 62 may access the memory 63 via an I/O interface (not shown). The memory 63 is used to store software or a group of software modules. The processor 62 reads out these software or software modules from the memory 63 and executes them.

The memory 63 includes a communication requirement management unit 56. The communication requirement management unit 56 manages information concerning the permissible latency of the end-to-end flow and the data sizes of the uplink flow and the downlink flow. The communication requirement management unit 56 may manage the data size of each path segment constituting the end-to-end flow. Managing may be paraphrased as retaining or preserving.

Managing the end-to-end flow permissible latency may mean, for example, managing a predetermined permissible latency in the service associated with the end-to-end flow. The service may be, for example, a service that, when a pedestrian or the like is shown on a video captured by a camera installed near an intersection, notifies the presence of the pedestrian to vehicles travelling near the intersection and other vehicles. By the vehicle detecting the presence of a pedestrian, it is possible to avoid a collision between the vehicle and the pedestrian. This video may be notified to the UE owned by the pedestrian. This makes it possible to notify the pedestrian that the pedestrian is approaching the vehicle. Further, the service may be a service that transmits information shown on a video captured by a camera installed on the road, to a vehicle traveling around the camera to avoid a collision between the vehicles. In such a service, the time from when the video captured by the camera corresponding to the UE 21 is transmitted to the application server 33 until when the vehicle corresponding to the UE 41 receives the information from the application server 33 is predetermined as a permissible latency.

Further, the service may be a service that transmits a video captured by a camera mounted on the vehicle to a UE owned by a pedestrian or another vehicle. This service can provide information that indicates a risk to the pedestrian or the other vehicle. Examples of information indicating a risk include one indicating that a vehicle equipped with a camera and a pedestrian are approaching to each other, or when the captured video shows another vehicle, one indicating that the shown vehicle and the pedestrian are approaching to each other.

Managing information concerning the data sizes of the uplink flow and the downlink flow may mean managing the data sizes associated with the data types of the uplink flow and the downlink flow. For example, it may be determined such that if the data type is text data, the data size is A (A is a positive number) kilobytes, and if the data type is moving image data, the data size is B (B is a positive number) megabytes.

The processor 62 is used to execute functions or processing in the data size monitoring unit 52, the permissible latency updating unit 53, the wireless quality monitoring unit 54, and the latency monitoring unit 55. The data size monitoring unit 52 determines the data sizes of the uplink flow and the downlink flow included in the end-to-end flow. For example, the data size monitoring unit 52 may acquire information concerning the data types of the uplink flow and the downlink flow from the application server 33. Further, the data size monitoring unit 52 may acquire the data size managed in association with the acquired data type from the communication requirement management unit 56.

Alternatively, when the MEC server 31 is used as an application server, the data size monitoring unit 52 may determine the data type using the received uplink flow and the downlink flow to be transmitted.

The permissible latency updating unit 53 may calculate expected communication latencies of the uplink flow and the downlink flow using the data sizes determined in the data size monitoring unit 52. For example, the permissible latency updating unit 53 may hold information concerning the communication system used in the wireless section included in the uplink path segment and the communication speed in the communication system used in the wired section. The permissible latency updating unit 53 may calculate the communication latency when the uplink flow of the data size determined in the data size monitoring unit 52 is transmitted at the communication speed in the uplink path segment, as the expected communication latency. The permissible latency updating unit 53 calculates the expected communication latency concerning the downlink flow in the same manner as in the uplink flow.

The permissible latency updating unit 53 may distribute a larger permissible latency to one having a larger expected communication latency in the uplink flow and the downlink flow and a smaller permissible latency to one having a smaller expected communication latency. The permissible latency updating unit 53 may assume that a value obtained by adding a predetermined latency to the expected communication latency is the permissible latency. Alternatively, the permissible latency updating unit 53 may assume that the same time as the expected communication latency of the uplink flow is the uplink permissible latency, and the permissible latency of the downlink flow is a value obtained by subtracting the uplink permissible latency from the permissible latency associated with the end-to-end flow. Alternatively, the permissible latency updating unit 53 may assume that the same time as the expected communication latency of the downlink flow is the downlink permissible latency, and the permissible latency of the uplink flow is a value obtained by subtracting the downlink permissible latency from the permissible latency associated with the end-to-end flow.

The wireless quality monitoring unit 54 monitors the wireless quality in each wireless section of the uplink path segment and the downlink path segment. The wireless quality monitoring unit 54 may receive, for example, information concerning the wireless quality between the UE 21 and the eNB 22 from the eNB 22 and information concerning the wireless quality between the UE 41 and the eNB 42 from the eNB 42. The information concerning the wireless quality may be, for example, the throughput in the wireless section, a modulation scheme applied in the wireless section, SINR (Signal to Interference plus Noise power Ratio), or the like. The wireless quality monitoring unit 54 outputs information concerning the wireless quality to the permissible latency updating unit 53.

The permissible latency updating unit 53 may correct the permissible latency distributed to the uplink flow and the downlink flow according to the wireless quality. For example, if the wireless quality in the uplink path segment is lower than the wireless quality in the downlink path segment, the permissible latency updating unit 53 may make corrections to increase the permissible latency of the uplink flow. Further, the permissible latency updating unit 53 may make corrections to reduce the permissible latency of the downlink flow.

Alternatively, the permissible latency updating unit 53 may correct the permissible latency distributed to the uplink flow and the downlink flow according to the fluctuation of the wireless quality. For example, the permissible latency updating unit 53 compares the fluctuation in wireless quality in the uplink path segment with the fluctuation in wireless quality in the downlink path segment. When determining that the fluctuation of the wireless quality in the uplink path segment is larger, the permissible latency updating unit 53 may make corrections to increase the permissible latency of the uplink flow and may make corrections to decrease the permissible latency of the downlink flow.

The latency monitoring unit 55 monitors the latency of the uplink flow. For example, the latency monitoring unit 55 may receive information concerning the latency of the uplink flow from the application server 33. The application server 33 may determine the latency of the uplink flow from, for example, the time stamp set in the data included in the uplink flow and the timing or time when the data is received. It is assumed that the timing or time information when data is transmitted from the UE 21 is set in the time stamp.

Alternatively, when the MEC server 31 is used as the application server, the latency monitoring unit 55 may execute similar processing to that of the application server 33 to determine the latency of the uplink flow.

When the latency of the uplink flow exceeds the permissible latency distributed to the uplink flow, the latency monitoring unit 55 transmits a message that instructs to discard the uplink flow, to the UE or the application server 33. The latency monitoring unit 55 may instruct to discard only the data or the data packet whose determined latency exceeds the permissible latency. Alternatively, the latency monitoring unit 55 may instruct to discard the data concerning the uplink flow that the application server 33 receives within a predetermined period since receiving the data or the data packet whose latency is determined. Alternatively, the latency monitoring unit 55 may instruct to discard all the data or data packets concerning the uplink flow received after receiving the data or data packet whose latency has been determined. When the MEC server 31 is used as an application server, the latency monitoring unit 55 discards the uplink flow that exceeds the permissible latency.

Alternatively, when the latency of the uplink flow exceeds the permissible latency distributed to the uplink flow, the latency monitoring unit 55 instructs the base station or gateway device or the like in the uplink path segment to discard the uplink flow.

Figure 4:
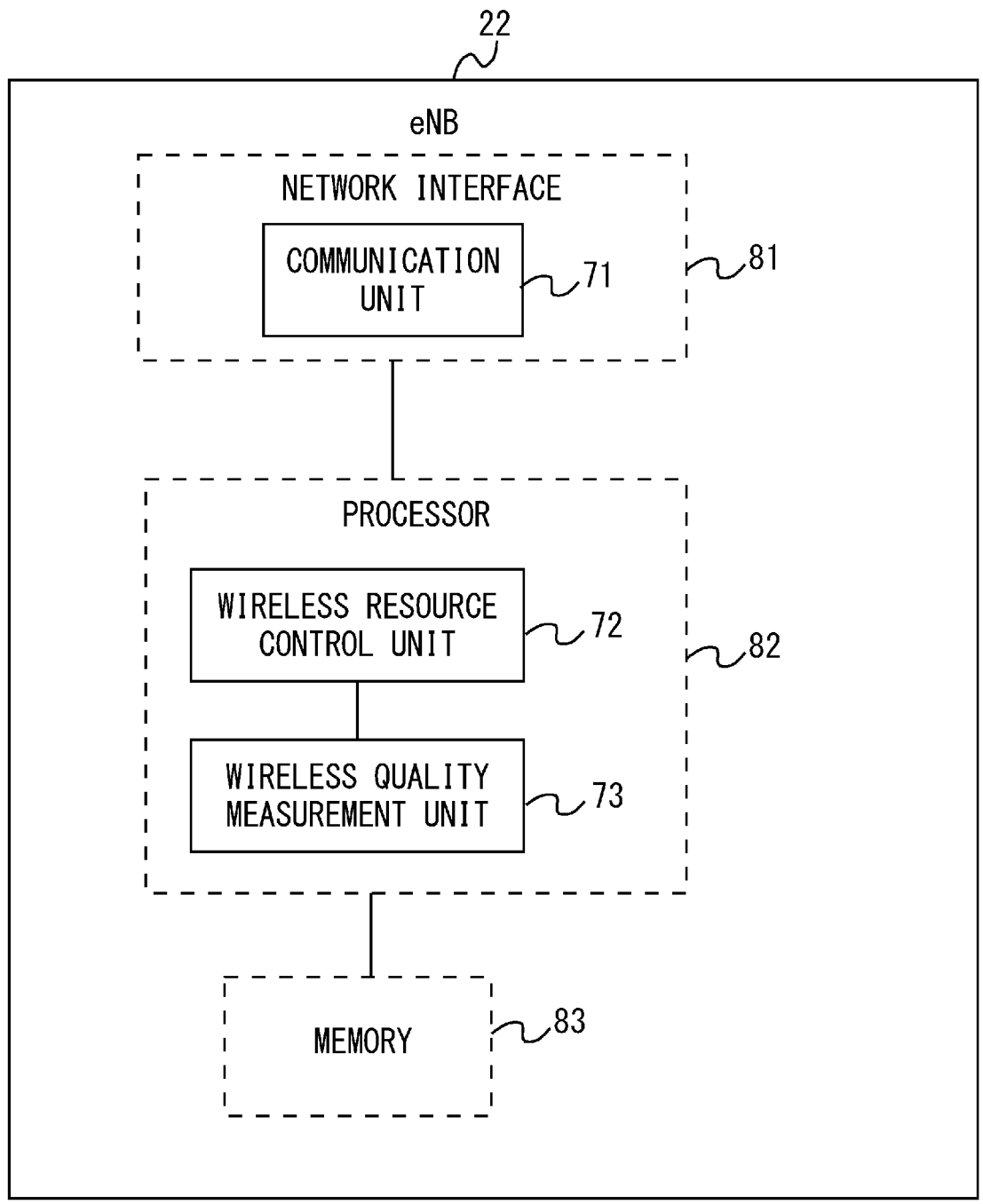
FIG. 4 is a block diagram of an eNB according to the second example embodiment.

Subsequently, a configuration example of the eNB 22 will be described with reference to FIG. 4. Since the eNB 42 has substantially the same configuration as that of the eNB 22, detailed description thereof will be omitted. The eNB 22 includes a network interface 81, a processor 82, and a memory 83.

The network interface 81 may include a baseband processor that performs digital baseband signal processing. Alternatively, the network interface 81 may include a network interface card (NIC) compliant with the IEEE 802.3 series. The network interface 81 includes a communication unit 71. The communication unit 71 may perform wireless communication with the UE 21 and may further perform wired communication with the MEC server 31 and the gateway device 32. The communication unit 71 may include a configuration for performing wireless communication and a configuration for performing wired communication.

The processor 82 reads out software (a computer program) from the memory 83 and performs the processing to be described below. The processor 82 may be, for example, a microprocessor, an MPU (Micro Processing Unit), or a CPU (Central Processing Unit). The processor 82 may include a plurality of processors. The processor 82 includes a wireless resource control unit 72 and a wireless quality measurement unit 73.

The wireless resource control unit 72 performs resource scheduling for a plurality of UEs including the UE 21. For example, the wireless resource control unit 72 may preferentially allocate wireless resources to a UE to which a higher priority is set in advance. The preferential allocation of wireless resources may mean, for example, allocating more wireless resources to a UE to which a higher priority is set, than to other UEs. The wireless resource may be a resource block. A resource block is a resource that is determined by using frequency and time. The resource block is a wireless resource specified in 3GPP.

Alternatively, the wireless resource control unit 72 may acquire information concerning the uplink permissible latency from the MEC server 31, and preferentially allocate the wireless resource to the UE that transmits an uplink flow having a shorter period until the uplink permissible latency ends.

Further, when receiving a message that instructs to dispose the uplink flow, from the MEC server 31, the wireless resource control unit 72 may dispose the data or the data packet concerning the uplink flow. Alternatively, when receiving a message that instructs to dispose the uplink flow, from the MEC server 31, the wireless resource control unit 72 may stop allocating the wireless resource to the UE that transmits the uplink flow.

The wireless quality measurement unit 73 measures the wireless quality in the wireless section between the UE 21 and the eNB 22. The wireless quality measurement unit 73 may measure, for example, a throughput and SINR. The wireless quality measurement unit 73 transmits the measured information to the MEC server 31 via the communication unit 71. Alternatively, the wireless quality measurement unit 73 may transmit information concerning the modulation scheme applied in the wireless section to the MEC server 31 via the communication unit 71 as information concerning the wireless quality.

The memory 83 is constituted by a combination of a volatile memory and a non-volatile memory. The memory 83 may include a storage disposed away from the processor 82. In this case, the processor 82 may access the memory 83 via an I/O interface (not shown). The memory 83 is used to store software or a group of software modules. The processor 82 reads out such software or a group of software modules from the memory 83 and executes them.

Figure 5:
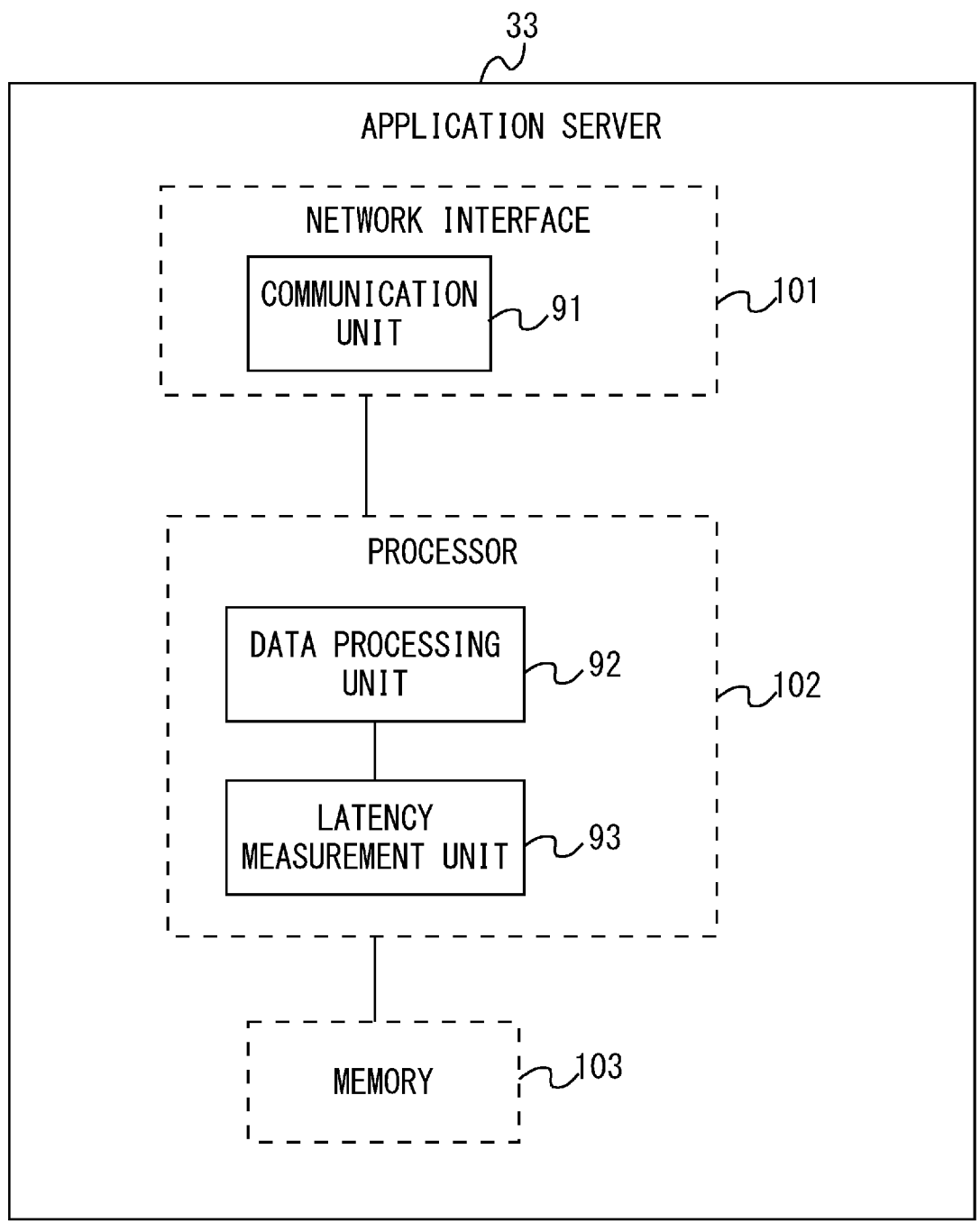
FIG. 5 is a block diagram of an application server according to the second example embodiment.

Subsequently, a configuration example of the application server 33 will be described with reference to FIG. 5. The application server 33 includes a network interface 101, a processor 102, and a memory 103.

The network interface 101 is used to communicate with other communication network devices. The network interface 101 may include a network interface card (NIC) compliant with the IEEE 802.3 series. The network interface 101 includes a communication unit 91.

The processor 102 reads out software (a computer program) from the memory 103 and performs the processing to be described below. The processor 102 may be, for example, a microprocessor, an MPU (Micro Processing Unit), or a CPU (Central Processing Unit). The processor 102 may include a plurality of processors.

The processor 102 is used to execute a function or processing in the data processing unit 92 and the latency measurement unit 93. The data processing unit 92 generates a predetermined downlink flow after receiving an uplink flow via the communication unit 91. Further, the data processing unit 92 transmits a downlink flow via the communication unit 91.

Further, when receiving a message that instructs to discard the uplink flow, from the MEC server 31, the data processing unit 92 discards the uplink flow. The data processing unit 92 may discard only the specified data or data packets. Alternatively, the data processing unit 92 may discard the data concerning the uplink flow received within a predetermined period from the data or the data packet designated to be discarded. Alternatively, the data processing unit 92 may discard all the data concerning the uplink flow received after receiving the data designated to be discarded.

Further, the data processing unit 92 may detect that the UE has discarded a part of the data of the uplink flow, and discard the remaining data of the concerned uplink flow.

The latency measurement unit 93 measures the latency of the uplink flow transmitted from the UE 21. The latency measurement unit 93 may measure the latency of the uplink flow from, for example, the time stamp set in the data included in the uplink flow, and the timing or time when the data is received. The latency measurement unit 93 transmits information concerning the measured latency to the MEC server 31 via the communication unit 91.

The memory 103 is constituted by a combination of a volatile memory and a non-volatile memory. The memory 103 may include a storage disposed away from the processor 102. In this case, the processor 102 may access the memory 103 via an I/O interface which is not shown. The memory 103 is used to store software or a group of software modules. The processor 102 reads out such software or a group of software modules from the memory 103, and executes them.

Figure 6:
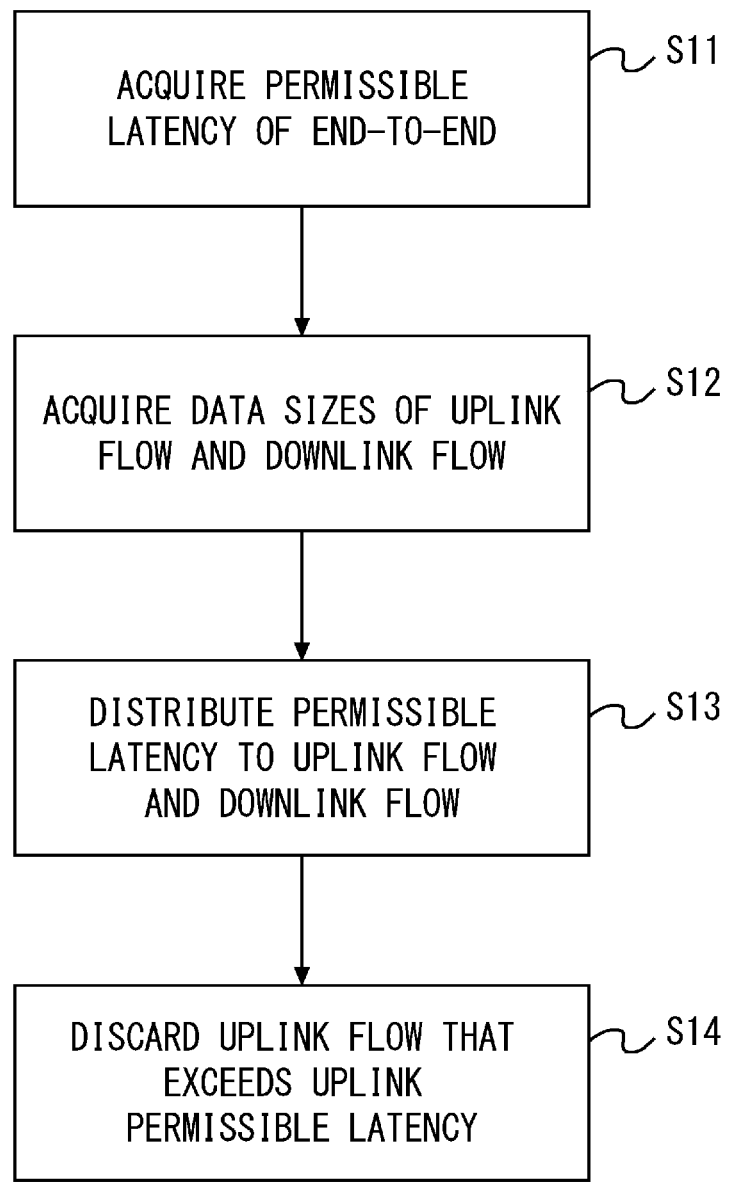
FIG. 6 is a diagram to show the flow of distribution processing of permissible latency according to the second example embodiment.

Subsequently, the flow of distribution processing of permissible latency according to the second example embodiment will be described with reference to FIG. 6. First, the permissible latency updating unit 53 acquires the permissible latency of the end-to-end flow from the communication requirement management unit 56 (S11). Next, the data size monitoring unit 52 acquires the data sizes of the uplink flow and the downlink flow included in the end-to-end flow from the communication requirement management unit 56 (S12). Next, the permissible latency updating unit 53 calculates the expected latency time in each flow using the data sizes of the uplink flow and the downlink flow acquired from the data size monitoring unit 52. Further, the permissible latency updating unit 53 distributes the permissible latency to the uplink flow and the downlink flow by using an expected, calculated latency time (S13).

Next, the latency monitoring unit 55 transmits a message that instructs to delete the data, to the application server 33 when the latency of the data included in the uplink flow exceeds the uplink permissible latency (S14).

As described so far, the MEC server 31 can distribute the permissible latency associated with the end-to-end flow to the uplink flow and the downlink flow according to the respective data sizes of the uplink flow and the downlink flow. Further, the MEC server 31 can correct the distributed permissible latency according to the wireless quality of the wireless sections included in the uplink path segment and the downlink path segment. That is, the MEC server 31 may increase the permissible latency to be distributed to the flow in which the wireless quality is degraded and the latency is expected to increase. Alternatively, the MEC server 31 may decrease the permissible latency to be distributed to the flow in which the wireless quality is being improved and the latency is expected to decrease. By the MEC server 31 adjusting the permissible latency to be distributed to the uplink flow and the downlink flow in this way, it is possible to decrease the data to be discarded.

In the example described above, the program can be stored by using various types of non-transitory computer-readable media, and supplied to a computer. The non-transitory computer-readable media include various types of tangible storage media. Examples of non-transitory computer-readable media include magnetic recording media, magneto-optical recording media (for example, magneto-optical disks), CD-ROMs (Read Only Memory), CD-Rs, CD-R/Ws, and semiconductor memories. The magnetic recording medium may be, for example, a flexible disk, a magnetic tape, or a hard disk drive. The semiconductor memory may be, for example, a mask ROM, a PROM (Programmable ROM), an EPROM (Erasable PROM), a flash ROM, or a RAM (Random Access Memory). The program may also be supplied to the computer by various types of transitory computer-readable media. Examples of transitory computer-readable media include electrical signals, optical signals, and electromagnetic waves. The transitory computer-readable medium can supply a program to the computer via a wired communication path such as an electric wire and an optical fiber, or a wireless communication path.

Note that the present disclosure is not limited to the above described example embodiments, and can be appropriately modified without departing from the spirit thereof.

Although the present invention has been described with reference to example embodiments, the present invention will not be limited to the above described example embodiments. Various changes, which can be understood by those skilled in the art, can be made in the configuration and details of the present invention within the scope of the invention.

This application claims priority based on Japanese Patent Application No. 2018-209525 filed on Nov. 7, 2018, the disclosure of which is herein incorporated by reference in its entirety.

For example, the whole or part of the example embodiments disclosed above can be described as, but not limited to, the following supplementary notes.

Supplementary Note 1

A management server, comprising:
control means configured to distribute permissible latency associated with an end-to-end flow to an uplink flow and a downlink flow, where the end-to-end flow is to be transmitted from a communication terminal of a transmission source to a communication terminal of a transmission destination via an application server, based on a data size of the uplink flow transmitted from the communication terminal of the transmission source to the application server, and a data size of the downlink flow transmitted from the application server to the communication terminal of the transmission destination, the data size of the downlink flow being different from the data size of the uplink flow; and
monitoring means configured to cause an uplink flow that has exceeded the permissible latency distributed to the uplink flow to be discarded in the communication terminal of the transmission source or the application server.

Supplementary Note 2

The management server described in Supplementary note 1, wherein
the control means is configured to distribute more permissible latency to a flow of a larger data size than to a flow of a smaller data size in the data size of the uplink flow and the data size of the downlink flow.

Supplementary Note 3

The management server described in Supplementary note 1 or 2, wherein
the control means is configured to correct the permissible latency distributed to the uplink flow and the downlink flow based on wireless quality in an uplink wireless section included between the communication terminal of the transmission source and the application server, and a downlink wireless section included between the application server and the communication terminal of the transmission destination.

Supplementary Note 4

The management server described in Supplementary note 3, wherein the control means is configured to increase permissible latency to be distributed to a flow including a wireless section in which wireless quality is low, and decrease permissible latency to be distributed to a flow including a wireless section in which wireless quality is high in the uplink wireless section and the downlink wireless section.

Supplementary Note 5

The management server described in any one of Supplementary notes 1 to 4, wherein
the control means is configured to estimate latency of the uplink flow and latency of the downlink flow by using the data size of the uplink flow and the data size of the downlink flow, and distribute the permissible latency associated with the end-to-end flow to the uplink flow and the downlink flow based on the estimated latency.

Supplementary Note 6

The management server described in any one of Supplementary notes 1 to 5, wherein
the monitoring means is configured to cause data which has not been discarded in the communication terminal of the transmission source to be discarded in the application server, out of the data included in the uplink flow that has exceeded the permissible latency distributed to the uplink flow.

Supplementary Note 7

A data processing method, comprising:
distributing permissible latency associated with an end-to-end flow to an uplink flow and a downlink flow, where the end-to-end flow is to be transmitted from a communication terminal of a transmission source to a communication terminal of a transmission destination via an application server, based on a data size of the uplink flow transmitted from the communication terminal of the transmission source to the application server, and a data size of the downlink flow transmitted from the application server to the communication terminal of the transmission destination, the data size of the downlink flow being different from the data size of the uplink flow; and
causing an uplink flow that has exceeded the permissible latency distributed to the uplink flow to be discarded in the communication terminal of the transmission source or the application server.

Supplementary Note 8

A non-transitory computer readable medium storing a program that makes a computer
distribute permissible latency associated with an end-to-end flow to an uplink flow and a downlink flow, where the end-to-end flow is to be transmitted from a communication terminal of a transmission source to a communication terminal of a transmission destination via an application server, based on a data size of the uplink flow transmitted from the communication terminal of the transmission source to the application server, and a data size of the downlink flow transmitted from the application server to the communication terminal of the transmission destination, the data size of the downlink flow being different from the data size of the uplink flow, and cause an uplink flow that has exceeded the permissible latency distributed to the uplink flow to be discarded in the communication terminal of the transmission source or the application server.

REFERENCE SIGNS LIST

10 Management server
11 Control unit
12 Monitoring unit
21 UE
22 eNB
31 MEC server
32 Gateway device
33 Application server
41 UE
42 eNB
51 Communication unit
52 Data size monitoring unit
53 Permissible latency updating unit
54 Wireless quality monitoring unit
55 Latency monitoring unit
56 Communication requirement management unit
61 Network interface
62 Processor
63 Memory
71 Communication unit
72 Wireless resource control unit
73 Wireless quality measurement unit
81 Network interface
82 Processor
83 Memory
91 Communication unit
92 Data processing unit
93 Latency measurement unit
101 Network interface
102 Processor
103 Memory

What is claimed is:
1. A management server, comprising:
at least one memory storing instructions, and
at least one processor configured to execute the instructions to;
distribute permissible latency time associated with an end-to-end flow to an uplink flow and a downlink flow, where the end-to-end flow is to be transmitted from a communication terminal of a transmission source to a communication terminal of a transmission destination via an application server, based on a data size of the uplink flow transmitted from the communication terminal of the transmission source to the application server, and a data size of the downlink flow transmitted from the application server to the communication terminal of the transmission destination, the data size of the downlink flow being different from the data size of the uplink flow;
transmit a message that instructs to discard the uplink flow, to the communication terminal or the application server, when the uplink flow has exceeded the distributed permissible latency time;
correct the permissible latency time distributed to the uplink flow and the downlink flow based on wireless quality in an uplink wireless section included between the communication terminal of the transmission source and the application server, and a downlink wireless section included between the application server and the communication terminal of the transmission destination; and predetermine a distribution ratio of permissible latency time for a flow having a larger data size and a flow having a smaller data size in the data size of the uplink flow and the data size of the downlink flow.

2. The management server according to claim 1, wherein the at least one processor is further configured to execute the instructions to distribute more permissible latency time to the flow of the larger data size than to the flow of the smaller data size in the data size of the uplink flow and the data size of the downlink flow.

3. The management server according to claim 1, wherein the at least one processor is further configured to execute the instructions to increase permissible latency time to be distributed to a flow including a wireless section in which wireless quality is low, and decrease permissible latency time to be distributed to a flow including a wireless section in which wireless quality is high in the uplink wireless section and the downlink wireless section.

4. The management server according to claim 1, wherein the at least one processor is further configured to execute the instructions to estimate latency of the uplink flow and latency of the downlink flow by using the data size of the uplink flow and the data size of the downlink flow, and distribute the permissible latency time associated with the end-to-end flow to the uplink flow and the downlink flow based on the estimated latency.

5. The management server according to claim 1, wherein the at least one processor is further configured to execute the instructions to cause data which has not been discarded in the communication terminal of the transmission source to be discarded in the application server, out of the data included in the uplink flow that has exceeded the permissible latency time distributed to the uplink flow.

6. A data processing method, comprising:

distributing permissible latency time associated with an end-to-end flow to an uplink flow and a downlink flow, where the end-to-end flow is to be transmitted from a communication terminal of a transmission source to a communication terminal of a transmission destination via an application server, based on a data size of the uplink flow transmitted from the communication terminal of the transmission source to the application server, and a data size of the downlink flow transmitted from the application server to the communication terminal of the transmission destination, the data size of the downlink flow being different from the data size of the uplink flow;

correcting the permissible latency time distributed to the uplink flow and the downlink flow based on wireless quality in an uplink wireless section included between the communication terminal of the transmission source and the application server, and a downlink wireless section included between the application server and the communication terminal of the transmission destination;

predetermining a distribution ratio of permissible latency time for a flow having a larger data size and a flow having a smaller data size in the data size of the uplink flow and the data size of the downlink flow; and transmitting a message that instructs to discard the uplink flow, to the communication terminal or the application server, when the uplink flow has exceeded the distributed permissible latency time.

7. A non-transitory computer readable medium storing a program that makes a computer distribute permissible latency time associated with an end-to-end flow to an uplink flow and a downlink flow, where the end-to-end flow is to be transmitted from a communication terminal of a transmission source to a communication terminal of a transmission destination via an application server, based on a data size of the uplink flow transmitted from the communication terminal of the transmission source to the application server, and a data size of the downlink flow transmitted from the application server to the communication terminal of the transmission destination, the data size of the downlink flow being different from the data size of the uplink flow, correct the permissible latency time distributed to the uplink flow and the downlink flow based on wireless quality in an uplink wireless section included between the communication terminal of the transmission source and the application server, and a downlink wireless section included between the application server and the communication terminal of the transmission destination, predetermine a distribution ratio of permissible latency time for a flow having a larger data size and a flow having a smaller data size in the data size of the uplink flow and the data size of the downlink flow, and transmit a message that instructs to discard the uplink flow, to the communication terminal or the application server, when the uplink flow has exceeded the distributed permissible latency time.

* * * * *